Figures 1, 2:
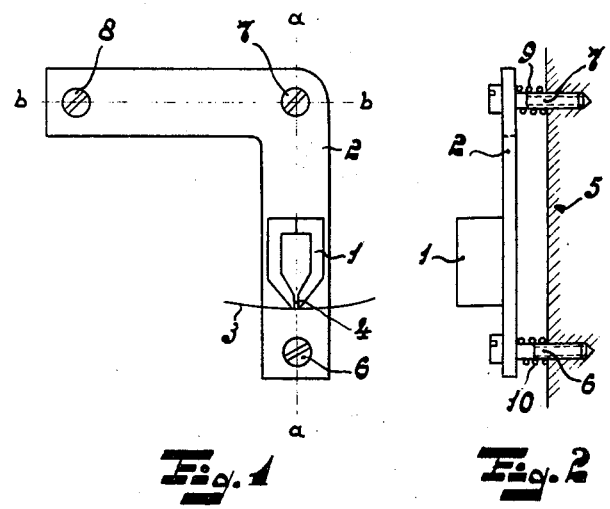

July 28, 1959  J. WIJCHMAN  2,897,288

DEVICE FOR ADJUSTING THE AIR-GAP POSITION OF MAGNETIC HEADS

Filed Dec. 6, 1954

INVENTOR
JAN WIJCHMAN
BY
AGENT

United States Patent Office 2,897,288
Patented July 28, 1959

2,897,288

DEVICE FOR ADJUSTING THE AIR-GAP POSITION OF MAGNETIC HEADS

Jan Wijchman, Emmasingel, Eindhoven, Netherlands, assignor, by mesne assignments, to North American Philips Company, Inc., New York, N.Y., a corporation of Delaware Application December 6, 1954, Serial No. 473,363

Claims priority, application Netherlands December 8, 1953

4 Claims. (Cl. 179—100.2)

The present invention relates to devices for the positioning of magnetic head air-gaps.

In devices for magnetically recording and reproducing intelligence it is important that the magnetic heads occupy the correct positions with respect to one another and with respect to the magnetic recording medium during the recording and reproducing process. A deviation of 0.1° from the parallelism of the air-gaps may have a disturbing influence upon the process.

In order to insure the correct position of the magnetic head, a device for adjusting the air-gap is known from German patent specification No. 828,014, the magnet head being secured to an adjusting plate which is rotatably arranged about two intersecting axes. The axes are determined by the use of a four-point adjustment constituted by a single fixed rib of constant length and three screws, of which one serves to space the adjusting plate and the others serve to secure the adjusting plate to the housing of the device.

Such a device has the disadvantage that the adjusting plate is necessarily subjected to bending stress in tightening the two fixing screws located on each side of the axis passing through the other points of adjustment. A comparatively rigid adjusting plate is thus required, since for obtaining a correct adjustment the profile of the adjusting plate must not vary as a result of and during the adjustment.

Furthermore, due to the presence of a rib engaging the housing of the device, it is impossible to displace the adjusting plate in parallel to itself in a direction at right angles to the housing and thus to vary the height of the air-gap with respect to the magnetic recording medium.

In order to mitigate the said disadvantages, in the device according to the invention, the axes about which the adjusting plate is rotatably arranged are determined by the use of a three-point adjustment constituted by three independent securing members for securing the adjusting plate to the housing of the device. The adjusting plate and the housing are separated by resiliently deformable means, which also determine the spacing between said housing and said plate.

In the device according to the invention, a comparatively thin plate suffices, since the afore-mentioned internal stress does not occur. The location of a surface is determined by three points which are not in line with one another, so that displacement of one adjusting point only results in rotation of the plate about the axis passing through the other points without being impeded by a fourth point.

Furthermore, the space required for the adjusting plate may be considerably reduced by increasing the number of points of adjustment. This may be regarded as an important advantage in view of the compact structure of the device.

The quantity of material used for the adjusting plate may, in addition, be considerably decreased on account of the reduced thickness and surface of said plate.

The resiliently deformable means are preferably constituted by screw springs, since it is thus possible for the adjusting plate and hence the magnet head to be displaced parallel to itself in a direction at right angles to the housing of the device.

At least one of the intersecting axes about which the adjusting plate is rotatably arranged advantageously passes through the air-gap of the magnet head. When the correct position is adjusted to by rotation about the axis which does not pass through the air-gap, adjustment by rotation about the other axis, which does pass through the air-gap, cannot disturb the first-mentioned adjustment. It has thus been found possible with such an adjusting device to obtain the two adjustments independently of one another.

In order that the invention may be readily carried into effect, it will now be described with reference to the accompanying drawing, given by way of example, in which:

Fig. 1 is a plan view of a preferred embodiment of the device of the present invention; and Fig. 2 is a side-view of the embodiment of Fig. 1.

In both figures, a magnet head 1 is secured to an adjusting plate 2 which is rotatably arranged about two intersecting axes $a$—$a$ and $b$—$b$. The axes $a$—$a$ and $b$—$b$ extend at right angles and parallel respectively to the direction of movement of a magnetic recording medium 3 at the area of the air-gap 4 of the magnet head 1 in such a manner that the axis $a$—$a$ passes through the air-gap. According to the invention the axes are determined by the use of a three-point adjustment constituted by three independent securing members for securing the adjusting plate 2 to a housing 5. The securing members comprise bolts 6, 7, 8 which are fixed in the housing 5 and which also determine the spacing between the housing and the plate due to the provision of screw springs between them. Springs 9 and 10 are shown in Fig. 2.

The head 1 is adjusted by first adjusting the adjusting plate 2 to the correct position by rotation about the axis $b$—$b$. The rotation about axis $b$—$b$ may be effected by more or less tightening of the bolt 6, on the one hand, and of the bolts 7 and 8, on the other hand. Subsequently, a rotation about axis $a$—$a$ may take place by turning the bolt 8; it being evident that the first-mentioned adjustment is not influenced thereby.

The height of the head 1 with unvaried position of the gap 4 with respect to the housing 5, and hence with respect to the carrier 3, may be varied by equally turning the bolts 6, 7, 8 in the same sense.

What is claimed is:

1. A device for adjusting the position of a magnetic head having an air-gap comprising a plate, said magnetic head being fixedly mounted on said plate, a housing, and means for adjustably affixing said plate to said housing comprising three independent members engaging said plate and said housing in selected positions, said members forming two mutually perpendicular intersecting axes in the plane of said plate, one of said axes passing coaxially through said air-gap, two of said independent members being aligned with said air-gap on said one of said axes, and resiliently deformable means positioned between said plate and said housing whereby said head is selectively arcuately movable about said two intersecting axes thereby providing three point adjustment of said head.

2. A device as claimed in claim 1, wherein said resiliently deformable means comprises a plurality of compression springs positioned to urge said plate away from said housing.

3. A device for adjusting the position of a magnetic head having an air-gap comprising a plate, said magnetic head being fixedly mounted on said plate, a housing, and means for adjustably affixing said plate to said housing comprising three adjusting bolts engaging said plate and said housing in selected positions, said bolts forming two mutually perpendicular intersecting axes in the plane of said plate, one of said axes passing coaxially through said air-gap, two of said independent members being aligned with said air-gap on said one of said axes, and compression spring means positioned between said plate and said housing for urging said plate away from said housing whereby said head is selectively arcuately movable about said two intersecting axes thereby providing three point adjustment of said head.

4. In a magnetic tape recording and reproducing device, a movable member, a magnetic head carried by said member and provided with an air-gap, a support, means to adjust said member with respect to said support at a point spaced from said air-gap on an axis passing through the air-gap, second means to move said member with respect to said support at a point on said axis spaced from said first means, and third means to move said member with respect to said support and around said axis, said third means being spaced from said first means on an axis intersecting said first axis.

References Cited in the file of this patent

UNITED STATES PATENTS

| | | |
|---|---|---|
| 2,560,569 | Hare | July 17, 1951 |
| 2,587,097 | Berlant | Feb. 26, 1952 |
| 2,644,856 | Pettus | July 7, 1953 |
| 2,668,879 | D'Arcy | Feb. 9, 1954 |
| 2,678,971 | Barany | May 18, 1954 |
| 2,680,785 | Franklin | June 8, 1954 |
| 2,689,412 | Young | Sept. 21, 1954 |

FOREIGN PATENTS

| | | |
|---|---|---|
| 676,810 | Germany | June 12, 1939 |
| 828,014 | Germany | Jan. 14, 1952 |